May 21, 1929.  L. E. KNUPPE  1,713,876
KITCHEN UTENSIL
Filed Nov. 5, 1927
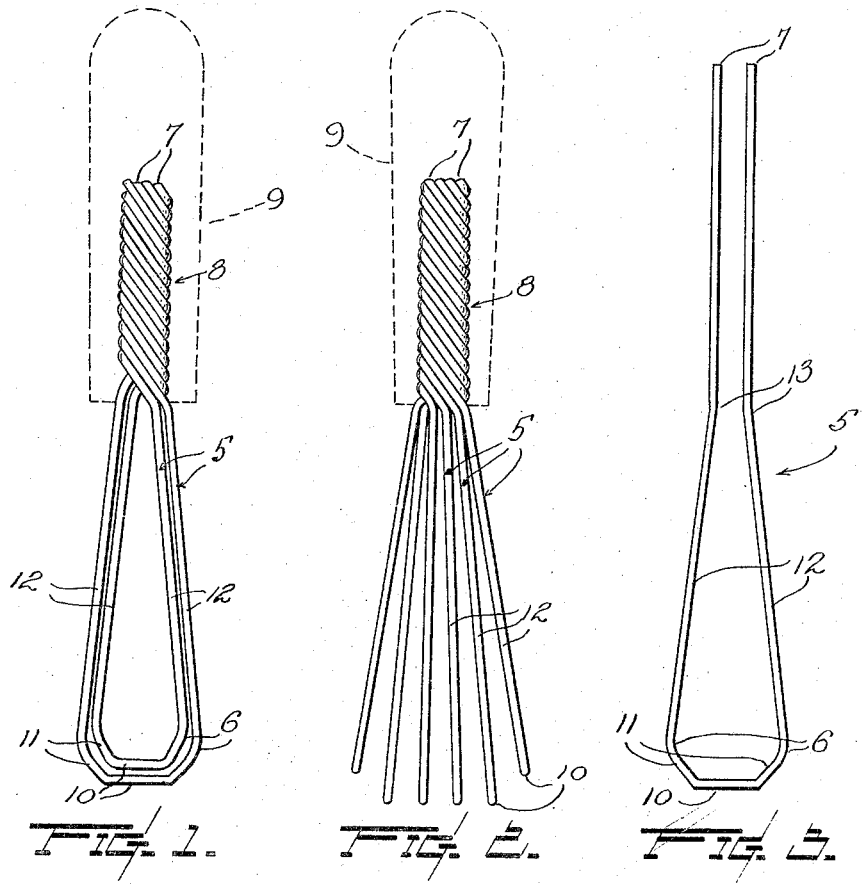
INVENTOR
Lillian E. Knuppe
BY
Pierre James
ATTORNEY Patented May 21, 1929.

1,713,876

UNITED STATES PATENT OFFICE.

LILLIAN E. KNUPPE, OF FAIRBANKS, TERRITORY OF ALASKA.

KITCHEN UTENSIL.

Application filed November 5, 1927. Serial No. 231,220.

This invention relates to kitchen utensils and has for an object the provision of an inexpensive device for rapidly and effectively mashing or creaming vegetables, fruit, or the like with a minimum of labor.

A further object is the provision of a device of this character which is of strong, durable construction and one which is readily cleaned.

With these and further objects which will be apparent in the following specification, the invention consists in the novel construction, adaptation and combination of parts hereinafter described and claimed.

In the drawing,—

Figures 1 and 2 are side and end elevations, respectively, of an embodiment of the invention, the handle being indicated in dotted lines. Fig. 3 is a side view of one of the loop elements of the device, shown detached; and Fig. 4 is an underside plan view of Figs. 1 and 2.

My improved masher comprises a plurality of loop elements 5 disposed in side by side relation and formed of wire, each doubled upon itself to provide a substantially triangular lower portion with corners removed as at 6 and terminating in ends 7. The ends 7 may be convoluted or otherwise joined with each other to unite all of the loop elements in a shank 8 common to all of the loops. Said shank is inserted within a handle stick as indicated by dotted lines 9 in Figs. 1 and 2.

More particularly, each of said loops is formed of a single piece of wire with a straight lower portion 10 disposed in right angular relation with the longitudinal axis of the loop; from the ends of said straight lower portion the wire extends outwardly and upwardly, as at 11, and thence in side portions 12 which converge gradually to terminals 13, as illustrated in Fig. 3.

The wire employed in the present invention is of a character conventionally known as spring wire which will receive a permanent set formation or which will be restored to its normal formation when temporarily distorted or bent in operation.

The use of a plurality of loops which, according to my invention are arranged in planes, not only render the loops readily accessible for cleaning, but also provide a most effective beater for eggs, cream, and other foods.

In beating or whipping operations the device is operated to cause the several loops to cut sideways, so to speak, through the material in a slightly arcuate direction, much as a housewife uses a fork in the same or analogous work.

In other words, for beating or whipping food, my improved device constitutes in effect a plurality of whipping elements functioning as a number of forks, one above the other.

As a masher for fruits and vegetables, the device is used endwise, the operator pushing the same downwardly and into the food to crush it into a mass which is forced upwardly in ribbon like formation between the parallel wire portions 10 in the downward travel of the masher. Repetitions of the mashing operations above described, provides a smooth and homogenous product.

What I claim, is,—

In a kitchen utensil, a plurality of elongated loop elements disposed in side by side relation, the outer portions of the respective loop elements being disposed at right angles to the longitudinal axes of the respective loop elements and in parallel relation with each other.

Signed at Fairbanks, Alaska, this 5 day of Oct., 1927.

LILLIAN E. KNUPPE.